(12) United States Patent
Chen et al.

(10) Patent No.: US 7,495,903 B2
(45) Date of Patent: Feb. 24, 2009

(54) MOUNTING APPARATUS FOR DATA STORAGE DEVICES

(75) Inventors: Yun-Lung Chen, Tu-Cheng (TW); Da-Long Sun, Shenzhen (CN); You-He Ke, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (CN)

( * ) Notice: Subject to any disclaimer, the term of this patent is extended or adjusted under 35 U.S.C. 154(b) by 497 days.

(21) Appl. No.: 11/237,219

(22) Filed: Sep. 28, 2005

(65) Prior Publication Data
US 2006/0245158 A1 Nov. 2, 2006

(30) Foreign Application Priority Data
Apr. 29, 2005 (CN) .................... 2005 2 0057963 U

(51) Int. Cl.
*H05K 7/12* (2006.01)
(52) U.S. Cl. ...................................... 361/685; 361/732
(58) Field of Classification Search ................. 361/685, 361/732
See application file for complete search history.

(56) References Cited

U.S. PATENT DOCUMENTS

| 5,995,364 | A | * | 11/1999 | McAnally et al. | ........... 361/685 |
| 6,456,489 | B1 | | 9/2002 | Davis et al. | .................. 361/684 |
| 6,543,866 | B2 | * | 4/2003 | Chen et al. | ................ 312/223.2 |
| 6,654,240 | B1 | * | 11/2003 | Tseng et al. | ................. 361/685 |
| 6,671,180 | B2 | | 12/2003 | Le et al. | ...................... 361/726 |
| 6,781,827 | B2 | * | 8/2004 | Goodman et al. | ........... 361/685 |

* cited by examiner

*Primary Examiner*—Lisa Lea-Edmonds
*Assistant Examiner*—Ingrid Wright

(57) ABSTRACT

A data storage device assembly includes a plurality of data storage devices with at least one locking hole defined therein, a first bracket and a second bracket for receiving the data storage device, a sliding board slidably attached to sidewalls of the first bracket and the second bracket, and a rotating member. At least one locking portion is formed on the sidewall thereof, and each locking portion has a pin thereon for engaging in the locking hole of the data storage devices. The sliding board has at least one block for driving the locking portion. The block drives the locking portion to urge the pin of the locking portion to disengage from the locking hole of the data storage devices when the sliding board is moved in a first direction.

18 Claims, 4 Drawing Sheets

MOUNTING APPARATUS FOR DATA STORAGE DEVICES

BACKGROUND OF THE INVENTION

1. Field of the Invention

The present invention relates to a mounting apparatus, and more particularly to a mounting apparatus that secures a plurality of data storage devices conveniently.

2. Background of the Invention

With the rapid development of computer technology, properties of computer make a dramatic improvement. However, a computer is still expensive for a common consumer. Accordingly, expansion capacity and convenient installation are two vital factors to be considered when designing computer. Various data storage devices are installed in a computer enclosure for communication and dealing with data. Such a device may be, for instance, a floppy disk drive, a CD-ROM/DVD-ROM drive, a CD-RW/DVD-RW drive or other similar device. Nowadays, a computer enclosure is tightly packed in order to keep the size of the system small to fit on or under a desk. A conventional data storage device is directly attached to a computer enclosure with screws. However, the screws are usually very small, therefore making it difficult for a computer user to hold the screws in position while screwing them in with a screwdriver. The screws are inserted into holes that are on the data storage device assembly and on the chassis to which the data storage device assembly is being attached. The holes are difficult to align because they are also typically very small. Also, if the tolerances are incorrect due to manufacturing defects, the holes may not line up exactly, making it difficult to insert the screws. Obviously, using screws to attach the data storage device to a computer enclosure may be arduous due to requiring insertion of the screws. Both insertion and removal of the screws are time consuming and cumbersome owing to the work space restrictions and difficult accessibility.

In addition, during the course of the operation of the data storage device, it may cause the data storage device to vibrate, therefore to make the screws come loose. As a result, one danger of damaging the data storage device comes into being. Understandably, some attempts have been taken to introduce a mounting apparatus for data storage devices without screws.

What is needed, therefore, is a mounting apparatus for data storage devices facilitating assembly and disassembly in a chassis.

SUMMARY

A mounting apparatus for data storage devices in accordance with a preferred embodiment of the present invention includes a plurality of data storage devices with at least one locking hole defined in a sidewall thereof, a first bracket for receiving the data storage devices, a second bracket securely mounted to the first bracket for receiving other data storage devices, a sliding board slidably attached to the sidewall of the first bracket and the second bracket, a rotating member and a spring. Both the first bracket and the second bracket have a sidewall. At least one locking portion is formed on the sidewall, and each locking portion has a pin thereon for engaging in the locking hole of the data storage device. The sliding board has at least one block for driving the locking portion. The block drives the locking portion to urge the pin of the locking portion to disengage from the locking hole of the data storage device when the sliding board is moved in a first direction or a second direction opposite to the first direction.

Other advantages and novel features of the present invention will be drawn from the following detailed description of preferred embodiment of the present invention with the attached drawings, in which:

DETAILED DESCRIPTION OF THE INVENTION

Figure 1:
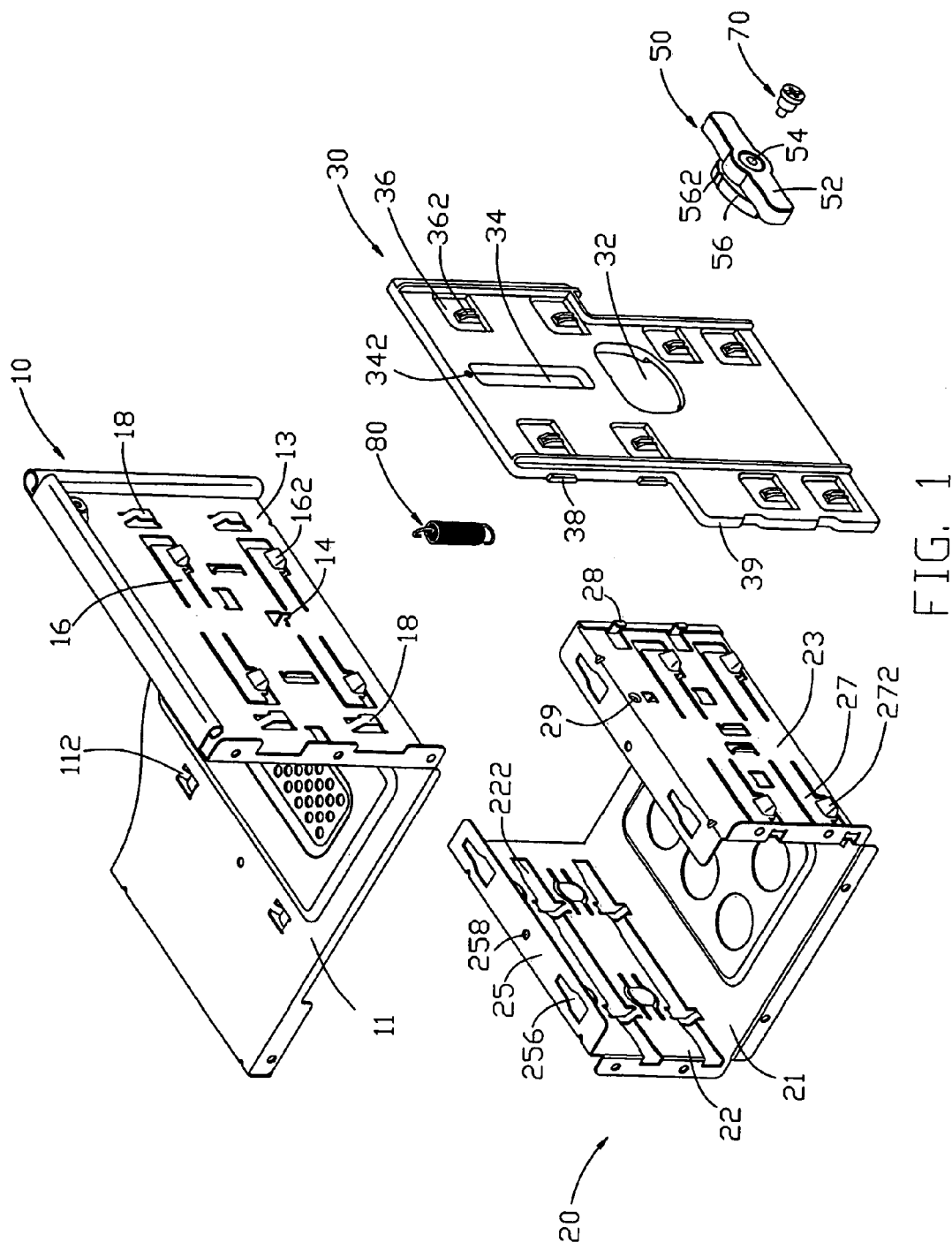
FIG. 1 is an exploded, isometric view of a mounting apparatus for data storage devices in accordance with a preferred embodiment of the present invention including a first bracket, a second bracket, a sliding board and a rotating member.
Figure 4:
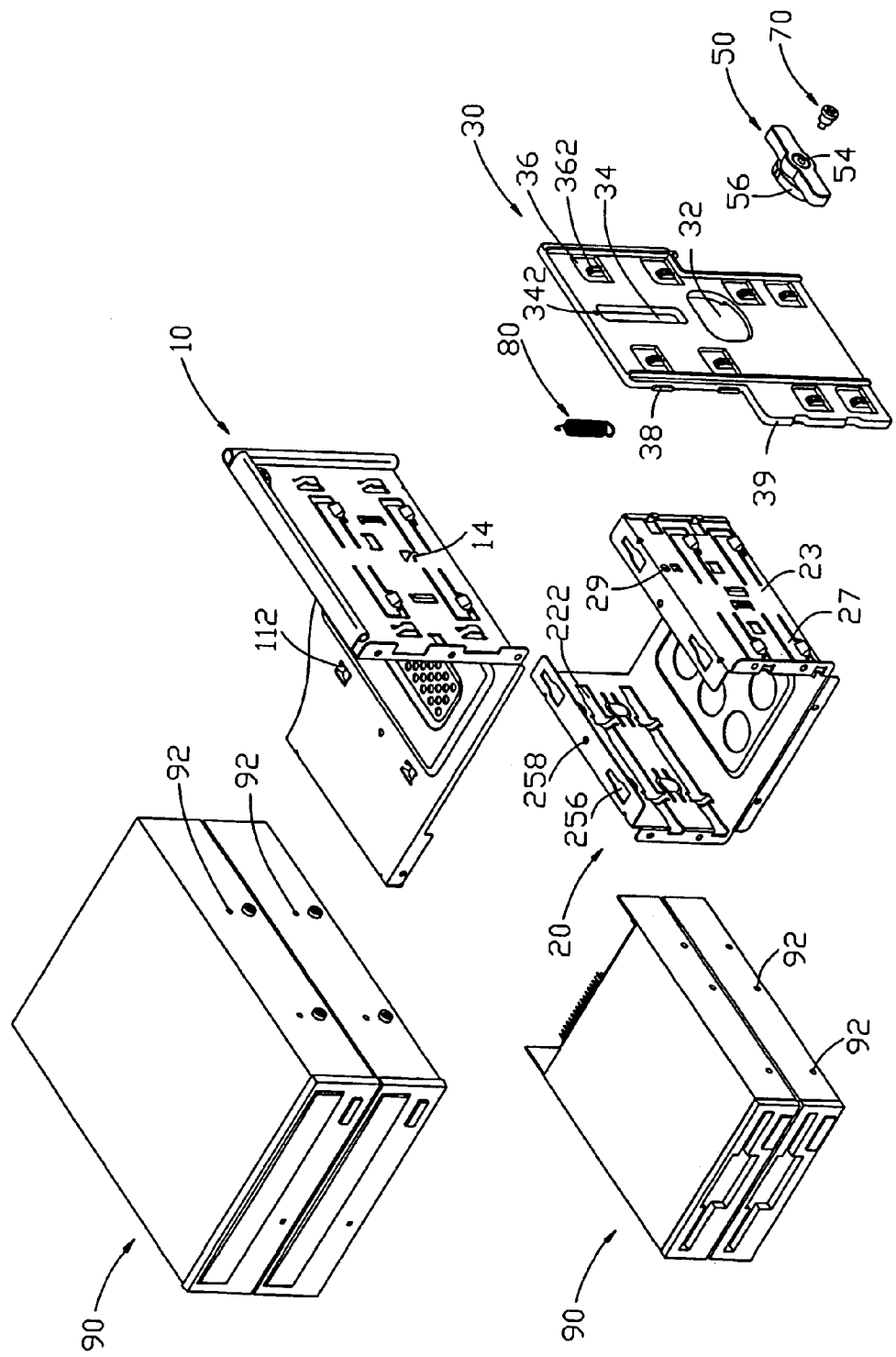
FIG. 4 is similar to FIG. 1, but shown a plurality of data storage devices.

Referring to FIGS. 1 and 4, a mounting apparatus for data storage devices 90 as components of an electronic device like a desktop computer in accordance with a preferred embodiment of the present invention includes a first bracket 10, a second bracket 20, a board-like sliding member 30, a rotating member 50, a screw 70 and a spring 80.

Figure 2:
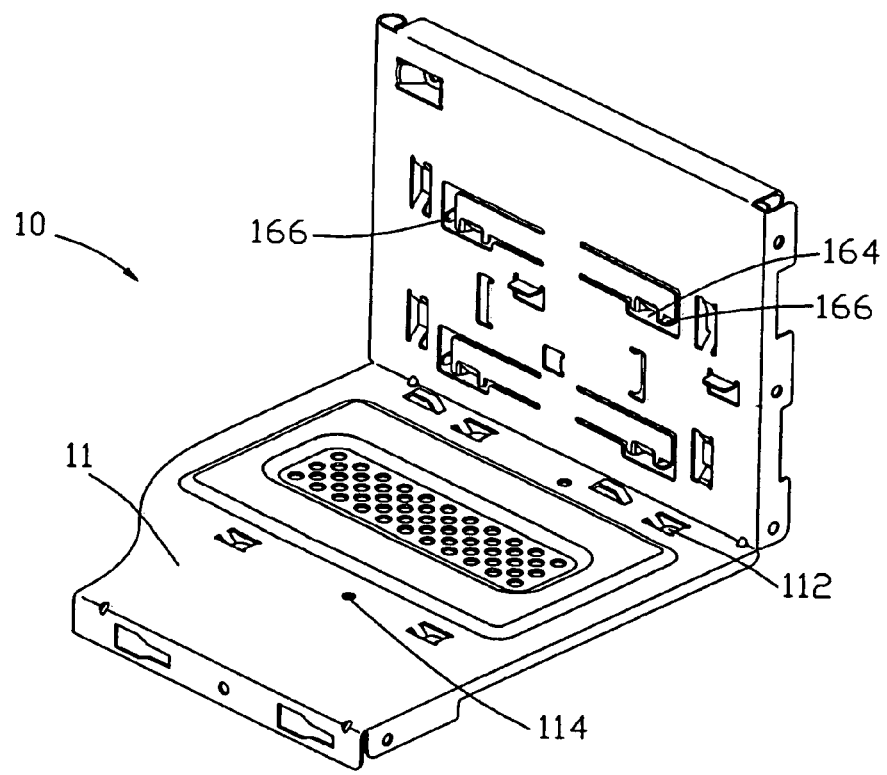
FIG. 2 is an enlarged, isometric view of the first bracket of FIG. 1, but viewed from another aspect.

Referring also to FIG. 2, the first bracket 10 includes a bottom plate 11 and a sidewall 13 perpendicular to the bottom plate 11. The bottom plate 11 is stamped to form a plurality of sliding portions 112. A securing hole 114 is defined in the bottom plate 11 between two sliding portions 112. A hook 14 is protruded outwards from a middle portion of the sidewall 13 for catching one end of the spring 80. Four elastic locking portions 16 are formed on the sidewall 13 around the hook 14. The elastic locking portion 16 has a free end with a protrusion 162 formed outwards thereon. A wedge-shaped cutout 164 is defined in the protrusion 162. A pin 166 is extended inwards from an inner side of the locking portion 16. A plurality of vaulted resisting tabs 18 are stamped to form on the sidewall 13 adjacent to the free end of the locking portion 16.

The second bracket 20 includes a bottom panel 21 and two parallel sidewalls 22, 23 perpendicular to the bottom panel 21. The two sidewalls 22, 23 are both bent to form a flange 25 at a top edge thereof. Two winebottle-shaped apertures 256 are defined in each flange 25 corresponding to the sliding portion 112 of the first bracket 10. The winebottle-shaped aperture 256 has a wide portion and a narrow portion. A mounting hole 258 is defined in each flange 25 between the two apertures 256 corresponding to the securing hole 114 of the first bracket 10. The sidewall 23 forms four elastic locking portions 27 same to the locking portions 16 of the sidewall 13. Each elastic locking portion 27 also has a free end with a protrusion 272 formed outwards thereon. A wedge-shaped cutout (not labeled) is also defined in the protrusion 272. A pin (not labeled) is also extended inwards from an inner side of each locking portion 27. A plurality of L-shaped resisting tabs 28 is extended outwards from the sidewall 13 at a side edge thereof. A positioning hole 29 is defined in the sidewall 23 adjacent to the flange 25. Two parallel slideways 222 are formed on the sidewall 22.

Figure 3:
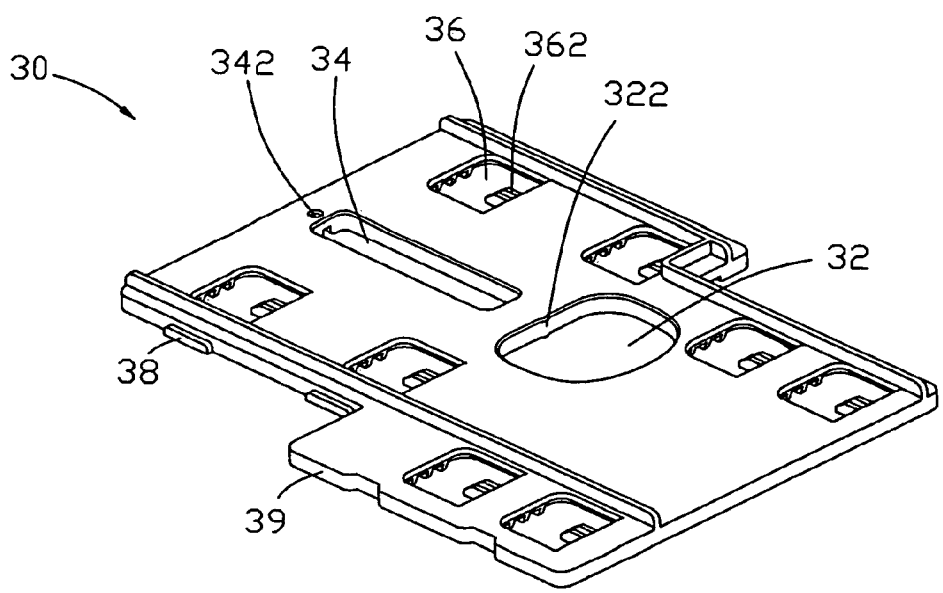
FIG. 3 is an enlarged, isometric view of the sliding board of FIG. 1, but viewed from another aspect.

Referring to FIG. 3, the sliding board 30 is generally S-shaped. An elliptic opening 32 is defined in the sliding board 30 at a middle portion thereof. An arris 322 is formed on a top edge of the opening 32. A narrow opening 34 is defined in the sliding board 30 above the opening 32. A through hole 342 is defined in the sliding board 30 over the narrow opening 34 for securing one end of the spring 80. A plurality of quadrate openings 36 is defined in the sliding board 30 corresponding to the free ends of the locking portions 16, 27 of the first bracket 10 and second bracket 20. A generally wedge-shaped block 362 is formed at a bottom edge of each quadrate opening 36 for upwardly lifting the protrusion 162 of the locking portion 16 and the protrusion 272 of the locking portion 27. A plurality of elongated first sliding blocks 38 is extended outwards vertically from an upper side edge of the sliding board 30 corresponding to the vaulted resisting tabs 18. A plurality of second sliding blocks 39 is formed on a lower side edge of the sliding board 30 corresponding to the L-shaped resisting tabs 28.

Figure 5:
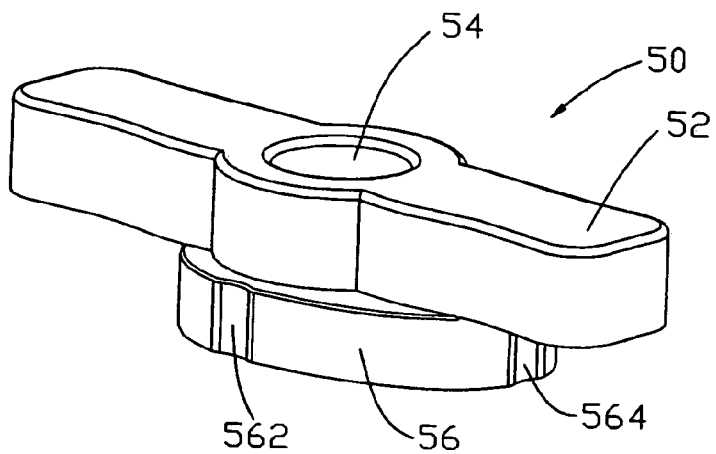
FIG. 5 is an enlarged, isometric view of the rotating member of FIG. 1, but viewed from another aspect.

Referring also to FIG. 5, the rotating member 50 includes a rotating handle 52 formed at one end thereof. A securing hole 54 is defined in a middle portion of the rotating handle 52. An oval turntable 56 connected with the rotating handle 52 is formed on the rotating member 50. A pair of grooves 562 corresponding to the arris 322 of the sliding board 30 is defined in the turntable 56 at upper and lower edges thereof. Similarly, a pair of grooves 564 corresponding to the arris 322 of the sliding board 30 is defined in the turntable 56 at a right end and a left end thereof. A screw 70 is extended through the securing hole 54 of the turntable 52 and the positioning hole 29 of the second bracket 20 to secure the rotating member 50 on the second bracket 20.

The data storage devices 90 may be a CD-ROM drives or other devices, such as DVD-ROM drives, floppy disk drives, CD-RW drives, CD/DVD-RW drives and so on. One sidewall of the data storage devices 90 defines a plurality of locking holes 92 therein corresponding to the pins of the locking portions 16, 27. The other sidewalls of the data storage devices 90 are formed to have guiding blocks (not shown) for sliding in the slideways 222. The first bracket 10 further includes a sidewall (not shown) parallel to the sidewall 13. The sidewalls form a plurality of slideways (not shown) similar to the slideways 222 of the second bracket 20.

Figure 6:
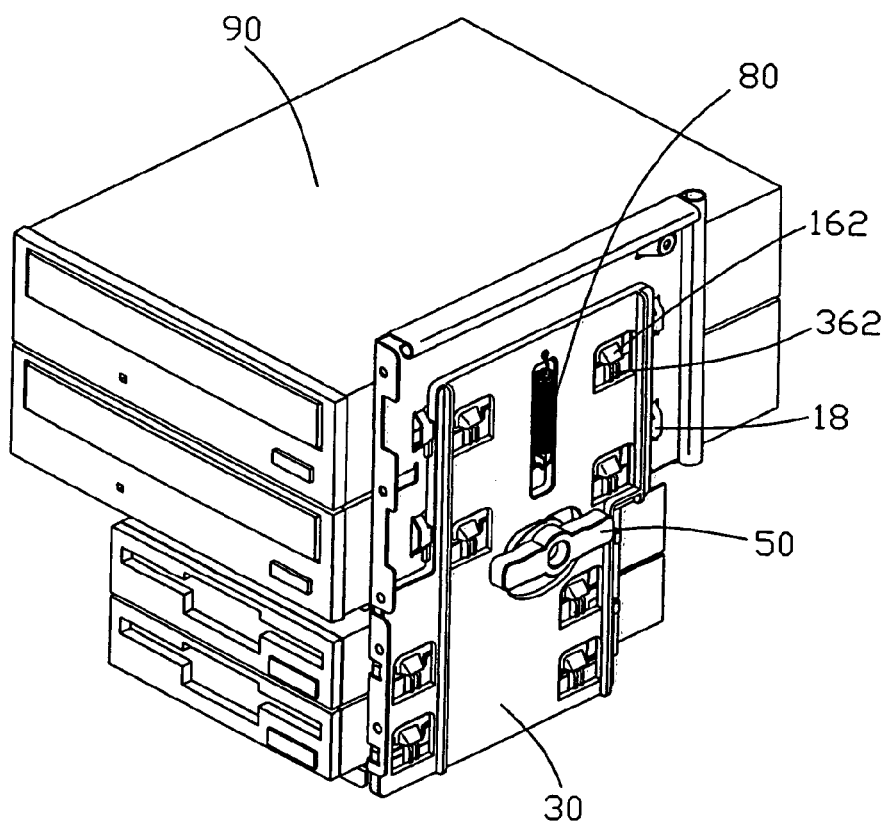
FIG. 6 is an assembled isometric view of FIG. 4.

Referring to FIG. 6, before the data storage devices 90 are mounted to the first bracket 10 and second bracket 20, the sliding portions 112 of the first bracket 10 firstly slide into the wide portions of the corresponding apertures 256 of the second bracket 20. Then, the sliding portions 112 of the bracket 10 slide into the narrow portions of the corresponding apertures 256 of the second bracket 20 and engage in the apertures 256. A screw (not shown) is extended through the securing hole 114 of the first bracket 10 and the mounting hole 258 of the second bracket 20 for securing the second bracket 20 on the first bracket 10. The first sliding blocks 38 and second sliding blocks 39 of sliding board 30 slide upwardly along the vaulted resisting tabs 18 of the first bracket 10 and the L-shaped resisting tabs 28 of the second bracket 20 until the sliding board 30 is slidably fixed to the first bracket 10 and second bracket 20. A screw 70 is extended through the securing hole 54 of the rotating member 50 and the positioning hole 29 of the second bracket 20 to mount the rotating member 50 on the second bracket 20. Simultaneously, the turntable 56 of the rotating member 50 is received into the opening 32 of the sliding board 30 and the rotating member 30 can pivot about the screw 70. One end of the spring 80 is connected with the hook 14 of the first bracket 10 and the other end of the spring 80 is engaged in the through hole 342 of the sliding board 30. The turntable 56 is pressed by the top edge of the opening 32 of the sliding board 30 due to the spring 80.

In assembly of the data storage devices 90, firstly, the rotating handle 52 of the rotating member 50 is pivoted clockwise or anticlockwise. The turntable 56 of the rotating member 50 lifts upwardly (in a first direction) the sliding board 30 until the arris 322 of the sliding board 30 engages in the groove 564 of the turntable 56. The wedge-shaped blocks 362 of the sliding board 30 insert into the cutouts 164 of the protrusions 162 and the cutouts of the protrusion 272. Consequently, the free ends of the locking portions 16, 27 move outwards so that the pins 166 of the locking portions 16 and the pins of the locking portion 27 also move outwards until the pins 166 of the locking portions 16 and the pins of the locking portion 27 locate outside the sidewall 13 and the sidewall 23. Then, the data storage devices 90 are inserted into the first bracket 10 and second bracket 20 along the slideways 222 of the second bracket 20 and the slideways of the first bracket 10 until the pins 166 of the locking portions 16 and the pins of the locking portion 27 are in alignment with the locking holes 92 of the data storage devices 90 respectively. The rotating handle 52 of the rotating member 50 is pivoted anticlockwise or clockwise so that the arris 322 of the sliding board 30 disengages from the groove 564 of the turntable 56. The silding board 30 moves up and down along with rotation of the rotating member 50 until the arris 322 of the sliding board 30 engages in the groove 562 of the turntable 56. Thus, the wedge-shaped blocks 362 of the sliding board 30 disengage with the protrusions 162 of the locking portions 16 and the protrusions 272 of the locking portions 27. Accordingly, the locking portions 16 and the locking portions 27 come back to an original position due to elasticity. Simultaneously, the pins 166 of the locking portions 16 and the pins of the locking portions 27 insert into the corresponding locking holes 92 of the data storage devices 90 for securing the data storage devices 90. Thereby, the data storage devices 90 are securely mounted in the first bracket 10 and the second bracket 20.

In disassembly of the data storage devices 90, the rotating handle 52 of the rotating member 50 is pivoted clockwise or anticlockwise. The turntable 56 of the rotating member 50 lifts upwardly the sliding board 30 until the arris 322 of the sliding board 30 engages in the groove 564 of the turntable 56. The wedge-shaped blocks 362 of the sliding board 30 insert into the cutouts 164 of the protrusions 162 and the cutouts of the protrusion 272. Consequently, the free ends of the locking portions 16, 27 move outwards so that the pins 166 of the locking portions 16 and the pins of the locking portion 27 are drawn from the locking holes 92 of the data storage devices 90. Thus, the data storage devices 90 can be easily taken out from the first bracket 10 and second bracket 20 along the slideways 222 of the second bracket 20 and the slideways of the first bracket 10.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

We claim:
1. A data storage device assembly comprising:
 a plurality of data storage devices, each data storage device defining at least one locking hole in a sidewall thereof
 a first bracket for receiving the data storage device, the first bracket having a sidewall, at least one locking portion formed on the sidewall, the locking portion having a pin thereon for engaging in the locking hole of the data storage device;

a second bracket securely mounted to the first bracket for receiving another data storage device, the second bracket having a sidewall, at least one locking portion formed on the sidewall, the locking portion having a pin thereon for engaging in the locking hole of the data storage device;

a sliding board slidably attached to the both the sidewall of the first bracket and the sidewall of the second bracket, the sliding board having at least one block for driving the locking portion, whereby the pin of the locking portion is disengaged from the locking hole of the data storage device; and a rotating member pivotably mounted on the second bracket for driving the sliding board to move.

2. The data storage device assembly as recited in claim 1, wherein the data storage device assembly further comprises a spring for urging the sliding board to come back to an original position.

3. The data storage device assembly as recited in claim 1, wherein the sliding board defines an opening, and the rotating member has a turntable received in the opening for driving the sliding board.

4. The data storage device assembly as recited in claim 3, wherein the sliding board has an arris at an upper edge of the opening, and at least one groove is defined in the turntable for engaging with the arris.

5. The data storage device assembly as recited in claim 3, wherein the rotating member has a rotating handle connected with the turntable.

6. The data storage device assembly as recited in claim 1, wherein a protrusion is formed at an end of each locking portion, and an opening is defined in the sliding board for the protrusion extending therethough.

7. The data storage device assembly as recited in claim 1, wherein the first bracket is formed to have a plurality of resisting tabs, and a plurality of sliding blocks is formed on the sliding board for sliding along the resisting tabs.

8. The data storage device assembly as recited in claim 1, wherein a plurality of apertures is defined in the second bracket, and the first bracket is formed to have a plurality of sliding portions at a bottom thereof for engaging in the apertures.

9. A data storage device assembly comprising:
at least one data storage device;
a bracket for receiving the data storage device, the bracket having a sidewall, at least one locking portion formed on the sidewall for engaging with the data storage device;
a sliding board movably attached to the sidewall of the bracket, the sliding board having at least one block for driving the locking portion; and
a rotating member pivotably mounted on the bracket, the rotating member having a turntable for driving the sliding board to move in a first direction or a second direction opposite to the first direction, whereby the block drives the locking portion to disengage from the data storage device.

10. The data storage device assembly as recited in claim 9, wherein the data storage device assembly further comprises a spring for urging the sliding board to come back to an original position.

11. The data storage device assembly as recited in claim 9, wherein the sliding board defines an opening to receive the turntable for driving the sliding board.

12. The data storage device assembly as recited in claim 11, wherein the sliding board has an arris at an upper edge of the opening, and at least one groove is defined in the turntable for engaging with the arris.

13. The data storage device assembly as recited in claim 9, wherein the rotating member has a rotating handle for convenient operation.

14. The data storage device assembly as recited in claim 9, wherein a protrusion is formed at an end of the locking portion, and an opening is defined in the sliding board for the protrusion extending therethough.

15. The data storage device assembly as recited in claim 9, wherein a pin is extended from an inner side of the locking portion for engaging with the data storage device.

16. The data storage device assembly as recited in claim 9, wherein the bracket is formed to have a plurality of resisting tabs, and a plurality of sliding blocks is formed on the sliding board for sliding along the resisting tabs.

17. An electronic device comprising:
at least two separate and installable components of said electronic device;
a bracket installed in said electronic device and defining a space therein to accommodate said at least two components, said bracket comprising at least two locking portions formed at a sidewall thereof and said at least two locking portions capable of respectively securing each of said at least two components in said space of said bracket along approachable directions of said at least two locking portions respectively toward said each of at least two components installed in said space of said bracket; and
a sliding member movably attachable to said sidewall of said bracket outside said space, and resiliently movable along another direction different from said approachable directions of said at least two locking portions between a first position thereof where said sliding member commonly engages with all of said at least two locking portions to remove simultaneously said securing of said at least two locking portions onto said at least two components, and a second position thereof where said sliding member disengages from all of said at least two locking portions to resume said securing of said at least two locking portions onto said at least two components respectively; and
a rotating member attachable to a selective one of said sidewall of said bracket and said sliding member so as to be rotatable thereat for guiding resilient movement of said sliding member between said first and second positions thereof.

18. The electronic device as recited in claim 17, further comprising a second bracket neighboring said bracket for accommodating components of another kind therein, and said second bracket capable of allowing said sliding member to control securing of said components of another kind therein at the same time.

* * * * *